Feb. 8, 1966     N. KOHEN ETAL     3,233,429
HIGH-SPEED-DRILL CHUCK WITH FRICTION-TYPE COUPLING
Filed July 15, 1963     2 Sheets-Sheet 1
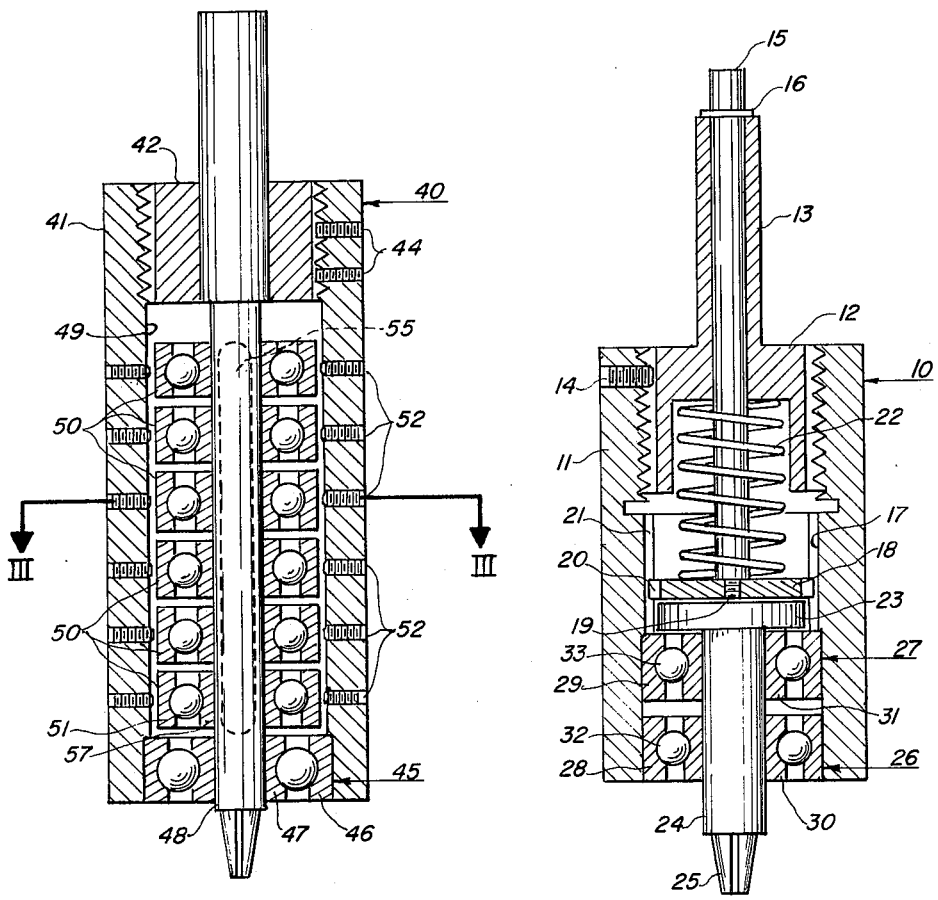
Fig. 2
Fig. 1
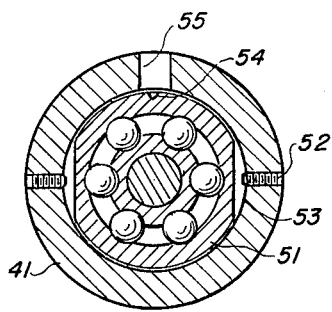
Fig. 3
INVENTORS:
NURI KOHEN
EDWARD ROSSOFF
BY
Karl G. Ross
AGENT.

3,233,429
HIGH-SPEED-DRILL CHUCK WITH FRICTION-TYPE COUPLING
Nuri Kohen, Jackson Heights, and Edward Rossoff, Brooklyn, N.Y., assignors to Yardney International Corp., a corporation of New York
Filed July 15, 1963, Ser. No. 295,076
9 Claims. (Cl. 64—23)

Our present invention relates to transmissions operable at relatively high speeds for the transfer of low torques and, more particularly, to high-speed-drill chucks and the like.

The problems involved in the use of high-speed drills of small diameters are subjects which have for many years formed the basis for a vast amount of research in tool design. It is well-known, for example, that small-diameter drills (e.g. numbers 60–80) having diameters as small as about 13 mils cannot be used in conventional drills without considerable breakage. While the drills themselves may be relatively inexpensive, the prime disadvantage of such breakage is that damage to the workpiece, which may have undergone previous, relatively costly machining or casting steps, may result. Moreover, the extraction of a broken drill bit is difficult if not impossible without undue enlargement of the bore. It has, therefore, been proposed hitherto to provide slip clutches and the like between the driving and driven members of a drill chuck. Such clutches may comprise a pair of juxtaposed (e.g. conical) surfaces frictionally engageable with one another and adapted to slip upon subjection of the bit to inordinately high stresses. However, as a consequence of the nonuniform action of such clutches, there is no reliable method of ensuring that at a particular instance the clutch will slip sufficiently to render the driving member free-wheeling with respect to the drill bit at a torque level insufficient to cause fracture thereof.

It is the principal object of the present invention to provide a high-speed, low-torque transmission for the reliable and reproducible transfer of rotatable movement from driving member to driven member.

A specific subject of our invention is to provide a high-speed-drill chuck suitable for use with small-diameter drills without the danger of breakage thereof.

These subjects and others which will become apparent hereinafter are attained, in accordance with our present invention, by providing a transmission having a driving and a driven member, one of which is provided with housing means forming an enclosure; a spindle connected to the other member extends into this enclosure bearing means being provided therewithin for coupling the driving and driven member. The bearing means includes first race means rotatable jointly with the housing, second race means rotatable jointly with the spindle and roller means intermediate the first and second race means but in frictional contact therewith so as to constitute the sole or primary coupling drivingly connecting the two members. It is clear, therefore, that an important principle of the present invention involves the use of roller bearings (e.g. ball and cylindrical-roller bearings) having a low but nevertheless significant coefficient of frictional coupling between the races as the sole or primary torque-transfer dervice connecting a driving member to the driven member. Since the frictional forces involved in the coupling of the driving and driven members are those of the rolling friction between the ball, conical or cylindrical rollers and the races engaged thereby, the disadvantages of devices relying primarily upon sliding friction for transfer of motive power and torque are reduced. It will be apparent, therefore, that in the system of the present invention there is less likelihood that surface contamination, ambient humidity and temperature variation, surface deterioration and development of frictional heat will adversely affect the operation of the mechanism and vary the torque threshold at which substantial slippage between driving and driven members occurs. This mechanism also makes use of the angular momentum of the tool bit and its holder to ensure the use of high drilling speeds without the danger that excessive pressure and chip formation will break the bit. Thus, when the drill bit or other tool is out of engagement with the workpiece, the frictional forces within the bearing means are sufficient, after a short while, to overcome totally the inertia of the tool and its holder so that the latter, which may be integral with the spindle, is rotated substantially with the speed of the driving member. The tool can then be brought into engagement with the workpiece while its angular momentum is relatively large to effect a chip-removal operation, the development of excessive pressure and impeding resistance immediately slowing the tool and permitting the driving element to be relatively freewheeling. When the tool is backed out of engagement with the workpiece, the sequence of operation is repeated. The torque applied to the tool, as a consequence of the frictional forces within the bearing means is, however, sufficient to permit finish-drilling of bores without excessive stopping.

According to another feature of our invention, the bearing means comprises a plurality of sets of individual bearings which can be axially aligned within the housing, while torque-adjusting means is provided for selectively coupling one of the races of each of the bearings with the housing or the spindle, respectively, to regulate the number of individual bearings interconnecting the driving and driven members. It is thus possible to increase the torque applied to the tool merely by increasing the number of bearings coupling the latter with the driving member or vice versa. The torque-adjusting means can include a plurality of individual locking members each associated with a respective bearing, displaceable into and out of engagement therewith or a common element displaceable into selective engagement with the individual bearings.

According to a further feature of this invention, the primary driving force provided by the aforedescribed bearing means, can be supplemented by conventional, adjustable slip-clutch means while, advantageously, means is provided for totally disengaging these slip-clutch means. The latter can, for example, include a friction member extending transversely to the axis of rotation of the spindle and adapted to bear against a transverse portion of the spindle.

The above and other subjects, features and advantages of the present invention will become more readily apparent from the following description, reference being made to the accompanying drawing in which:

FIG. 1 is an axial cross-sectional view through a drill chuck according to the present invention wherein the primary torque-transfer action of a bearing means can be supplemented by a slip-clutch;

FIG. 2 is an axial cross-sectional view through a drill chuck provided with torque-adjusting means according to the invention;

FIG. 3 is a cross-sectional view taken along the line III—III of FIG. 2;

Figure 4:
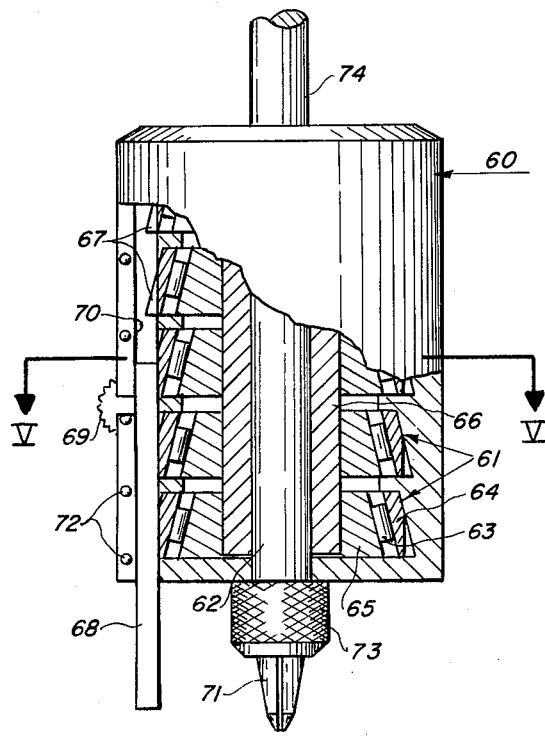
FIG. 4 is an axial cross-sectional view of a modified chuck.

In FIG. 1 we show a drill chuck whose bipartite housing 10 consists of a sleeve 11 threadedly mounted upon a hub 12 whose axially extending shank 13 can be coupled with a source of motive power. A setscrew 14 is provided to lock the sleeve 11 in place on hub 12. Shank 13 is tubular and serves as a guide for a stop rod 15 whose free extremity is provided with an abutment 16 adapted to seat against the end of shank 13. Rod 15 extends axially into an enclosure 17 within the housing means 10 and is secured to a transverse friction plate 18 by a screw 19, plate 18 being formed with splines 20 by means of which it is keyed to complementary grooves 21 formed in the interior of sleeve 11. A helical spring 22 bears against plate 18 and is seated on hub 12 to urge the plate against a transverse flange 23 of the drill spindle 24 whose spring jaws 25 are adapted to retain a drill bit or other cutting tool. Spindle 24 is journaled within housing 10 by a pair of bearings 26, 27 constituting the primary coupling between the driving member 13 and the driven member 25. Bearings 26, 27 are formed with respective first races 28, 29 rotatable jointly with sleeve 11 and respective second races 30, 31, jointly rotatable with spindle 24 the balls 32, 33 constituting angularly spaced roller means frictionally engaging the respective races. Balls 32 and 33 can be mounted in suitable bearing cages, not illustrated, in the conventional manner.

When the drill chuck is to be used for high-speed-drill boring, a small diameter drill is inserted into the jaws 25 and sleeve 11 rotated so as to draw it to the left relative to hub 12 until abutment 16 seats against shank 13 and flange 23 is spaced from the slip-clutch plate 18 so as to totally disengage the latter. Screw 14 is then tightened to lock the housing 10 and the latter is rotated at high speed via shank 13 to effect entrainment of spindle 24 as a consequence of the friction within bearings 26 and 27. When it is desired to supplement the torque applied by these bearings, setscrew 14 can be loosened, sleeve 11 shifted to the right relative to hub 12, and flange 23 thereby brought to bear upon plate 18 which is keyed to the housing 10. The slippage of spindle 24 is thus reduced by an amount proportional to the sliding friction between the spindle and the housing as determined by helical spring 22.

Figure 6:
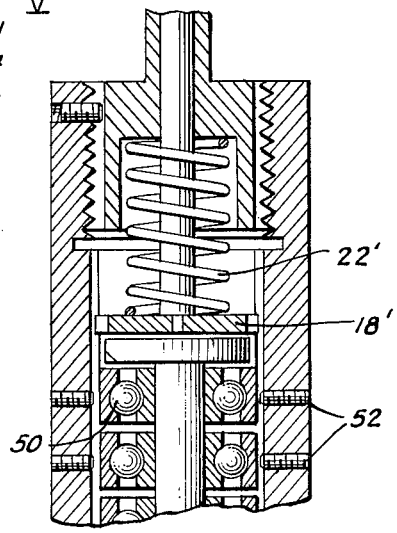
FIG. 6 is a view similar to FIG. 2 of another embodiment of the invention.

IN FIGS. 2 and 3 we show a modified chuck whose cylindrical housing 40 again has a hub 42 and a sleeve 41 threaded on to this hub, locking screws 44 being provided to secure the sleeve on the hub. A friction plate such as that illustrated at 18' and a spring (e.g. 22') can be provided in this arrangement as well to supplement the frictional force of the bearings (see FIG. 6). In this embodiment, the bearing means includes a first bearing 45 whose outer race 46 is permanently entrained by the sleeve 41 and whose inner race 47 can be placed onto the spindle 48 for permanent entrainment thereof. Within the cylindrical enclosure 49, we provide a plurality of individual, axially aligned bearings 50 whose inner races 57 can be freewheeling relative to housing portion 41. The torque-adjusting means includes a plurality of setscrews 52 individual to bearings 50 and adapted to seat against flats 53 formed in the outer race 51 of the respective bearing 50 when a notch 54 therein is aligned with a window slot 55 extending axially in sleeve 41. When it is desired to adjust the torque to be applied to the drill bit received within spindle 48, one or more of bearings 50 can be put into play by the tightening of screws 52, care being taken not to stress the outer races 51 and cause binding of the bearings. The number of bearings engaged for a particular drill bit can be readily noted through slot 55. It is possible, although not as satisfactory, according to a modification of the invention, to dispense with the setscrews 52 and provide permanent axially extending formations within sleeve 41, of torque being then adjusted by removing sleeve 41 from hub 42 and adding or removing individual bearings from the enclosure 49.

Figure 5:
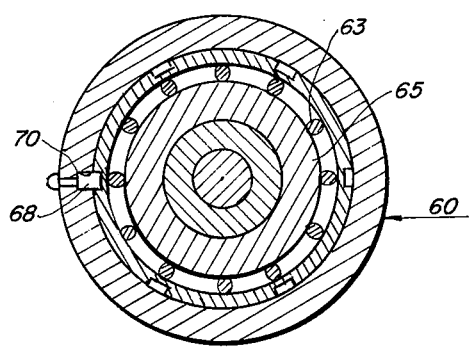
FIG. 5 is a cross-sectional view taken along the line V—V of FIG. 4.

FIGS. 4 and 5 illustrate another system for adjusting the torque. In this system, the housing 60 is provided with a shank 74 and is generally cylindrical but receives a plurality of conical bearings 61 which also serve as thrust-absorbing elements in addition to providing the driving force for the spindle 62. It should be noted that housing 60, although shown to be of unitary construction for convenience of illustration, can be composed of individual cylindrical sections joined together by tie rods or the like to permit assembly of the bearings 61. The latter have cylindrical rollers 63 frictionally interconnecting the outer races 64 and the inner races 65, the latter being press-fitted onto a mass of sleeve 66 secured to spindle 62 and designed to increase the angular momentum of the tool. Rollers 63 can, of course, be provided with the usual cages, not shown. The outer races 64 of bearings 61 are provided with a multiplicity of angularly spaced notches 67 engageable by a locking key 68 axially displaceable within housing 60 and having an actuating member 69. Key 68 is guided in a slot 70 within housing 60. When it is desired to adjust the torque applied to the jaws 71 of spindle 62, key 68 is selectively brought into engagement with a greater or smaller number of bearing races 64. Detent means, such as the spring-loaded balls 72, can be provided to releasably hold the key 68 in place. Jaws 71 can be opened and closed by the usual manually rotatable knurled nut 73 threaded onto spindle 62.

The invention as described and illustrated is believed to admit of many modifications within the ability of persons skilled in the art, all such modifications being considered within the spirit and scope of the appended claims.

What is claimed is:

1. In a transmission for the transfer of torques, in combination, a driving and a driven member; housing means on one of said members forming an enclosure; a spindle extending within said enclosure and rotatable relatively to said housing means, said spindle being operatively connected to the other of said members; bearing means within said enclosure interconnecting said housing means and said spindle coupling said driving and driven members for joint rotation, said bearing means including first race means rotatable jointly with said housing means, second race means rotatable jointly with said spindle, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum, and supplementary adjustable slip-clutch means interconnecting said driving and driven members for selectively increasing the torque applied to said driven member above that provided by said bearing means.

2. In a transmission for the transfer of torques, in combination, a driving and a driven member; housing means on one of said members forming an enclosure; a spindle extending within said enclosure and rotatable relatively to said housing means, said spindle being operatively connected to the other of said members; bearing means within said enclosure interconnecting said housing means and said spindle coupling said driving and driven members for joint rotation, said bearing means including first race means rotatable jointly with said housing means, second race means rotatable jointly with said spindle, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum; supplementary adjustable slip-clutch means interconnecting said driving and driven members for selectively increasing the torque applied to said driven member above that provided by said bearing means; and means for totally disengaging said slip-clutch means.

3. In a transmission for the transfer of torques, in combination, a driving and a driven member; housing means on one of said members forming an axially extending generally cylindrical enclosure, a spindle extending coaxially within said enclosure and rotatable relatively to said housing means, said spindle being operatively connected to the other of said members; bearing means within said enclosure interconnecting said housing means and said spindle and constituting substantially the sole driving means coupling said driving and driven members, said bearing means including first race means rotatable jointly with said housing means, second race means rotatable jointly with said spindle, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum, said bearing means including a plurality of axially aligned individual bearings each provided with a first race jointly rotatable with said housing means, a second race jointly rotatable with said spindle and a plurality of rollers interposed between the races; and torque-adjusting means for selectively coupling one of the races of each of said bearings with the respective member for regulating the number of individual bearings interposed between said members.

4. In a transmission for the transfer of torques, in combination, a driving and a driven member, housing means on one of said members forming an axially extending generally cylindrical enclosure; a spindle extending coaxially within said enclosure and rotatable relatively to said housing means, said spindle being operatively connected to the other of said members; bearing means within said enclosure interconnecting said housing means and said spindle and coupling said driving and driven for joint rotation, said bearing means including first race means rotatable jointly with said housing means, second race means rotatable jointly with said spindle, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum; supplementary adjustable slip-clutch means interconnecting said driving and driven members for selectively increasing the torque applied to said driven member above that provided by said bearing means; means for totally disengaging said slip-clutch means, said bearing means including a plurality of axially aligned individual bearings each provided with a first race jointly rotatable with said housing means, a second race jointly rotatable with said spindle and a plurality of rollers interposed between the races; and torque-adjusting means for selectively coupling one of the races of each of said bearings with the respective member for regulating the number of individual bearings interposed between said members.

5. A drill chuck, comprising a housing connectable with a source of motive power and forming a generally cylindrical enclosure; a chuck spindle adapted to receive a rotatable cutting tool extending axially within said enclosure and rotatable relatively to said housing; bearing means within said enclosure interconnecting said housing and said spindle while constituting substantially the sole driving means coupling said source with said tool, said bearing means including first race means rotatable jointly with said housing, second race means rotatable jointly with said spindle, and roller means intermediate said first and second face means and in frictional contact therewith for mutual rotary entrainment of said race means upon said spindle encountering an impeding resistance below a predetermined level and permitting substantially free relative displacement of said race means upon the torque applied to said spindle exceeding a predetermined maximum, said bearing means including a stacked array of axially aligned individual bearings each provided with a first race rotatable jointly with said housing, a second race rotatable jointly with said spindle, and a plurality of rollers interposed between the races; and torque-adjusting means for selectively coupling one of the races of each of said bearings with the respective member for regulating the number of said individual bearings frictionally coupling said spindle with said housing.

6. A drill chuck, comprising a housing connectable with a source of motive power and forming a generally cylindrical enclosure; a chuck spindle adapted to receive a rotatable cutting tool extending axially within said enclosure and rotatable relatively to said housing; bearing means within said enclosure interconnecting said housing and said spindle while constituting substantially the sole driving means coupling said source with said tool, said bearing means including first race means rotatable jointly with said housing, second race means rotatable jointly with said spindle, and roller means intermediate said first and second race means and in frictional contact therewith for mutual rotary entrainment of said race means upon said spindle encountering an impeding resistance below a predetermined level and permitting substantially free relative displacement of said race means upon the torque applied to said spindle exceeding a predetermined maximum, said bearing means including a stacked array of axially aligned individual bearings each provided with a first race rotatable jointly with said housing, a second race rotatable jointly with said spindle, and a plurality of rollers interposed between the races; and torque-adjusting means for selectively coupling one of the races of each of said bearings with the respective member for regulating the number of said individual bearings frictionally coupling said spindle with said housing, said torque-adjusting means including formations provided on each of said first races and manually displaceable means on said housing shiftable into engagement with said formations for locking said first races in entrainment with said housing.

7. A drill chuck, comprising a housing connectable with a source of motive power and forming a generally cylindrical enclosure; a chuck spindle adapted to receive a rotatable cutting tool extending axially within said enclosure and rotatable relatively to said housing; bearing means within said enclosure interconnecting said housing and said spindle while constituting substantially the sole driving means coupling said source with said tool, said bearing means including first race means rotatable jointly with said housing, second race means rotatable jointly with said spindle, and roller means intermediate said first and second race means and in frictional contact therewith for mutual rotary entrainment of said race means upon said spindle encountering an impeding resistance below a predetermined level and permitting substantially free relative displacement of said race means upon the torque applied to said spindle exceeding a predetermined maximum, said bearing means including a stacked array of axially aligned individual bearings each provided with a first race rotatable jointly with said housing, a second race rotatable jointly with said spindle, and a plurality of rollers interposed between the races; and torque-adjusting means for selectively coupling one of the races of each of said bearings with the respective member for regulating the number of said individual bearings frictionally coupling said spindle with said housing, said torque-adjusting means including formations provided on each of said first races and manually displaceable setscrew means on said housing individual to each of said bearings and shiftable into engagement with respective ones of said formations for locking said first races in entrainment with said housing.

8. In a transmission for the transfer of torques, in combination, a driving and a driven member; mounting means supporting said members for rotation relative to each other; bearing means coupling said driving and driven members for joint rotation, said bearing means including first race means rotatable jointly with one of said members, second race means rotatable jointly with the other of said members, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum, and supplementary adjustable slip-clutch means interconnecting said driving and driven members for selectively increasing the torque applied to said driven member above that provided by said bearing means.

9. In a transmission for the transfer of torques, in combination, a driving and a driven member; mounting means supporting said members for rotation relative to each other; bearing means coupling said driving and driven members for joint rotation, said bearing means including first race means rotatable jointly with one of said members, second race means rotatable jointly with the other of said members, and roller means intermediate said first and second race means and in frictional contact therewith for mutual rotary entrainment of said race means upon said driven member encountering an impeding resistance below a predetermined level and permitting substantially free relative displacement of said race means upon the torque applied to said driven member and required to overcome said impeding resistance exceeding a predetermined maximum; supplementary adjustable slip-clutch means interconnecting said driving and driven members for selectively increasing the torque applied to said driven member above that provided by said bearing means; and means for totally disengaging said slip-clutch means.

References Cited by the Examiner
UNITED STATES PATENTS

| | | |
|---|---|---|
| 1,612,954 | 1/1927 | Trbojevich. |
| 2,027,451 | 1/1936 | Rooney et al. _____ 64—30 |
| 2,132,928 | 10/1938 | Blanchard. |
| 2,293,085 | 8/1942 | Stieber. |
| 2,344,673 | 3/1944 | Brown _____ 64—29 |
| 2,974,504 | 3/1961 | Johnson. |

BROUGHTON G. DURHAM, *Primary Examiner.*

ROBERT C. RIORDON, *Examiner.*